Oct. 7, 1952
H. A. MAIMAN
2,613,089
HOSE COUPLING
Filed Aug. 3, 1950
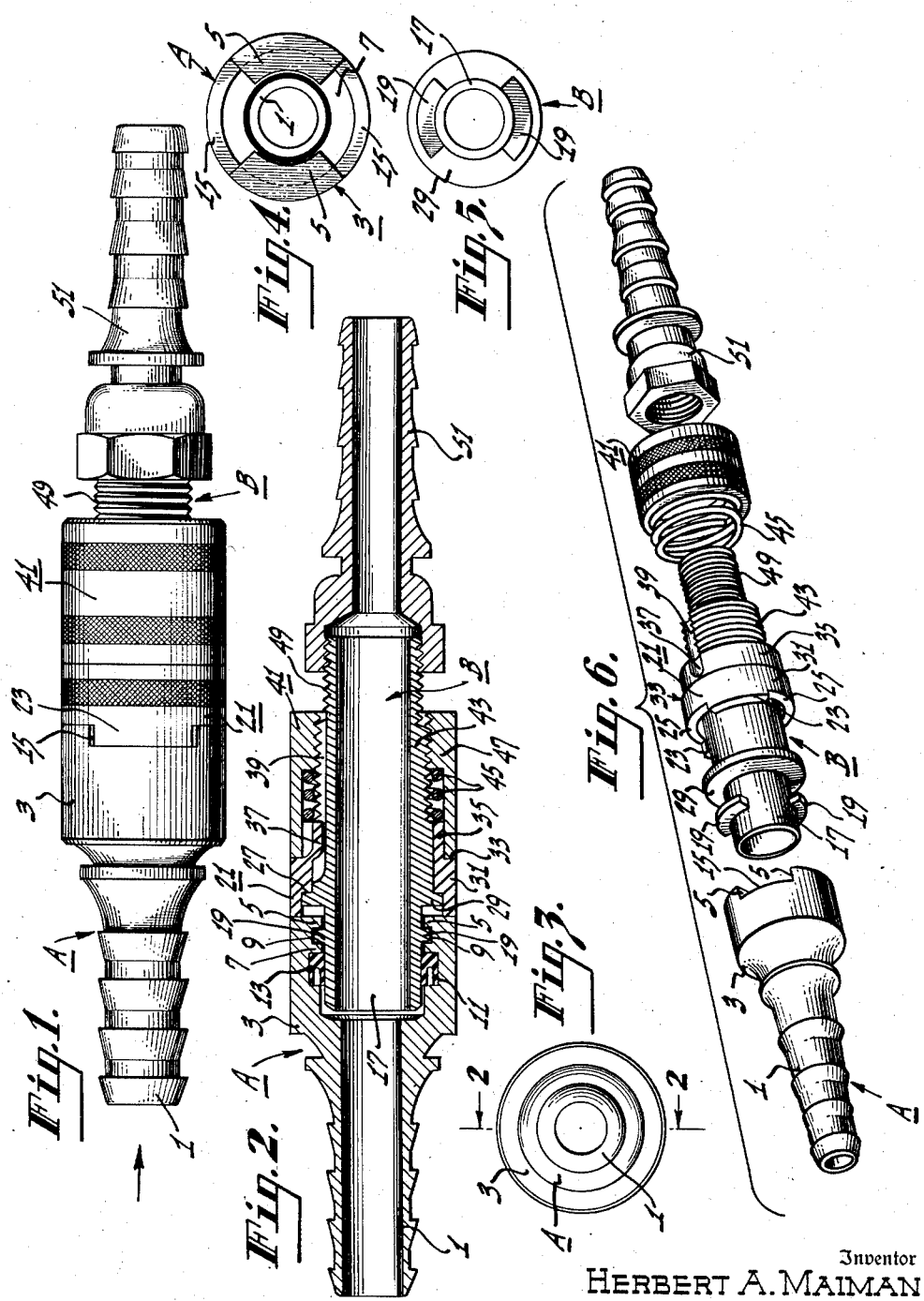
Inventor
HERBERT A. MAIMAN
By
Morris C. Rakin
Attorney

Patented Oct. 7, 1952

2,613,089

UNITED STATES PATENT OFFICE 2,613,089

HOSE COUPLING

Herbert A. Maiman, Havertown, Pa.

Application August 3, 1950, Serial No. 177,383

5 Claims. (Cl. 285—178)

This invention relates to mechanical couplings, and more particularly to couplings for connecting sections of flexible conduits designed to conduct fluids under pressure.

In various industries, compressed air is employed extensively as a source of energy for actuating many types of hand tools, such as chippers, caulkers, drills, grinders, hammers, tampers, riveters, and the like. Because these hand operated tools are portable, the conduits or piping through which the compressed air is fed thereto must be flexible. For this reason, it is customary to use rubber hose in such cases. The hose is usually furnished in sections of various lengths, the sections being coupled together by means of fittings or couplings of various sorts attached to the hose ends.

Among the various types of hose couplings presently in use is the type represented by the Bowes patent, 1,093,528. This type of coupling comprises a pair of plug and socket members arranged to be pushed together and turned about 90° for interlocking engagement. To maintain these members in interlocked relation, there is provided on the plug member a spring pressed locking sleeve formed with extensions which are received in recesses in the adjacent end of the socket member. This locking sleeve normally prevents the plug and socket members from rotating relative to each other into separable relation.

In practice, it has been found that the locking sleeve is not always effective to prevent the plug and socket members from rotating and separating, either due to carelessness of the operator or the manner in which the tool to which the line is attached is used. The average, commercial, compressed air line carries a pressure of about 90 pounds per square inch. At this pressure, an accidentally disconnected coupling can be a dangerous missile, since a hose line propelled by escaping air under pressure whips around with the coupling on the end as a weighted object. Depending upon circumstances, a whipping hose line and coupling striking a person can cause serious injury, if not even death.

The principal object of my invention is to provide an improved hose coupling which will be entirely free from the aforementioned difficulty.

More particularly, it is an object of my invention to provide an improved hose coupling the parts of which can be locked together positively and which are entirely free from the danger of becoming disconnected accidentally.

Another object of my invention is to provide an improved hose coupling as aforesaid the parts of which can be connected together and disconnected easily and quickly without the use of wrenches or other extraneous tools such as are required by many presently known hose couplings.

A further and most important object of my invention is to provide an improved hose coupling as above set forth which is entirely safe to use with all sorts of known tools and under a great variety of conditions of use.

Still another object of my present invention is to provide an improved locking member for hose couplings of the type set forth which will positively retain the plug and socket members in connected relation once the locking device is set in locking position.

A still further object of my invention is to provide an improved plug member for hose couplings of the type set forth which is readily interchangeable with, and therefore a ready replacement for, existing plug members of conventional form.

Yet another object of my invention is to provide an improved hose coupling as aforesaid which will require less attention and maintenance than corresponding couplings heretofore in use.

It is also an object of my invention to provide an improved hose coupling as aforesaid which is simple in construction, easy to apply, readily suitable to a variety of sizes and types, facile to manufacture and assemble, and highly efficient in use.

In accordance with my invention, use may be made of more or less conventional parts at the mating ends of the plug and socket members. In the conventional Bowes type coupling, the spring which actuates the locking sleeve on the plug member into locking relation with the adjacent end of the socket member is located within the said sleeve. I have found it advantageous to remove this spring from within the locking sleeve and to place it within a second or auxiliary locking sleeve which is threadedly received on the plug member behind the first mentioned locking sleeve, the spring being exposed to bear, at one end, against the first mentioned or "primary" locking sleeve. Thus, the spring is still free to force the primary locking sleeve into locking relation with the socket member when the plug member is suitably mated therewith. However, by simply turning the auxiliary locking sleeve up against the primary locking sleeve thereafter, the parts become locked together in a positive manner, and it is impossible for the plug and socket members to become disconnected until the auxiliary locking sleeve is backed away from the primary locking sleeve a distance sufficient to permit the primary locking sleeve to be withdrawn from the socket member. Thereafter, of course, the plug and socket members can be rotated through the required angle to effect separation of their mating parts.

The novel features of my invention, as well as additional objects and advantages thereof, will be better understood from the following description of one embodiment thereof, when read in connection with the accompanying drawing in which Figure 1 is a side elevation of a hose coupling in accordance with my present invention showing the plug and socket members in assembled or connected relation and locked in this relation, Figure 2 is a central, sectional view thereof taken on the line 2—2 of Figure 3.

Figure 3 is an end view thereof as seen from the left of Figure 1, or viewed in the direction of the arrow appended to the latter figure, Figure 4 is an end view of the socket or female member as seen from the end thereof which mates with the plug member, Figure 5 is an end view of the plug or male member as seen from the end thereof which mates with the socket member, and Figure 6 is an exploded, perspective view of the coupling shown in Figure 1.

Referring more particularly to the drawing, there is shown a tubular, female or socket coupling member A with which is adapted to mate a tubular male or plug coupling member B. The female member A has a shank portion 1 for insertion into one end of one hose section and an enlarged head 3. The head 3 is formed, at the end remote from the shank 1, with a pair of inwardly directed, diametrically oppositely disposed, segmental flanges 5 behind which is an annular flange 7. The flange 7 is spaced from the segmental flanges 5 to provide recesses 9 for a purpose presently to be set forth. Behind the flange 7 is a seat or pocket 11 for a suitable gasket or washer 13 which serves to provide a fluid tight connection between the male and female members as will be pointed out more particularly hereinafter. Between the segmental flanges 5, the head 3 is recessed to provide a pair of diametrically oppositely located seats 15.

The male member B has a tubular stem 17 adapted to be inserted into the head 3 of the female or socket member A and to be gripped by the gasket 13, as shown in Figure 2. This provides a fluid-tight coupling between the male and female members B and A. To retain this coupling, the stem 17 is provided with a pair of outwardly extending, diametrically opposite, segmental flanges 19 for mating relationship with the flanges 5. By inserting the stem 17 into the socket 3 until the flanges 19 engage the annular flange 7 and then turning the members A and B relative to each other 90° in either direction, the flanges 19 will be entered into the recesses 9 behind the flanges 5 and the members A and B cannot thereafter be separated until they are rotated an additional 90° to free the flanges 5 and 19 from each other.

To lock the flanges 5 and 19 in mated relationship, a primary locking sleeve 21 is slidably mounted on the male or plug member B. The sleeve 21 is formed with a pair of forwardly extending, diametrically opposed projections 23 between which are seats or recesses 25, an inner shoulder 27 adapted to abut against an outwardly extending, annular flange 29 on the stem 17 for limiting forward movement of the sleeve 21 on the male member B, a portion of relatively large external diameter 31 terminating in a shoulder 33, and a portion of relatively small external diameter 35 beyond the shoulder 33. When the primary locking sleeve 21 is moved forwardly along the male member B after the flanges 5 and 19 have been brought into mating relationship as above described, its shoulder 27 eventually engages the annular flange 29, at which time the projections 23 of the sleeve 21 will have fully entered the seats 15 in the head 3 of the female member A and the segmental flanges 5 of the head 3 will have been fully received in the recesses or seats 25. The primary sleeve 21 is formed with a depressed lip or projection 37 which is received in a longitudinally extending channel or groove 39 in the male member B to prevent the primary locking sleeve 21 from turning on the member B. Thus, when the segmental flanges 5 and 19 are brought into mating relationship and the primary locking sleeve is advanced along the member B to seat its projections 23 in the seats 15, it is apparent that the members A and B will be prevented from turning relative to each other to cause disengagement of the flanges 5 and 19. It is now only necessary to lock the primary locking sleeve 21 in its advanced position on the male member B as above described.

For this purpose, I have provided an auxiliary locking sleeve 41 on the male member B. The sleeve 41 is of cup-like form, as best seen in Figure 2, and is threaded onto a relatively large diameter, threaded section 43 of the member B. Within the auxiliary sleeve 41 is a coiled spring 45 around the threaded section 43. The spring 45 bears at one end against the threaded, base end 47 of the sleeve 41 and at its other end against the proximate end of the small diameter portion 35 of the sleeve 21. Thus, when the auxiliary sleeve 41 is turned up somewhat on the male member B, the spring 45 becomes compressed and forces the primary locking sleeve forwardly to position its projections 23 in the seats 15. Thereafter, when the auxiliary locking sleeve 41 is further turned up along the male member B, its open end will eventually engage the shoulder 33 to positively lock the primary locking sleeve against the head 3 with its projections 23 seated in the seats 15 and the segmental flanges 5 seated in the seats 25. In this way, the danger of the primary locking sleeve 21 backing away from the head 3 is entirely eliminated. In fact, not until the auxiliary locking sleeve 41 is backed away from the primary locking sleeve 21 a distance sufficient to permit removal of the projections 23 from the seats 15 can the male and female coupling members be rotated to bring their respective flanges 19 and 5 out of mating relationship for separation of the two coupling members.

The male coupling member B is also formed with a threaded section 49 of smaller diameter than the section 43 for reception of a tubular shank 51 similar to the shank 1 and adapted to be received in one end of a hose section which is to be connected to the hose section in which the shank 1 is received. Any suitable hose may be employed, of course, and the respective hose sections may be secured to the shanks 1 and 51 in any suitable manner.

From the foregoing description, it will be apparent to those skilled in the art that I have provided an improved hose coupling the parts of which can be connected and positively locked together to insure complete safety in operation and handling. Although I have described my improved coupling particularly with reference to a hose coupling, it will be obvious that is is equally adaptable to many other applications where mechanical couplings are required, as in pipe couplings, rod couplings, flexible shaft couplings, etc. Also, while I have shown and described but a single embodiment of my invention, it should be apparent that many variations thereof are possible within the spirit of my invention. Therefore, I desire that the foregoing description shall be taken merely as illustrative and not as limiting.

I claim as my invention:

1. A mechanical coupling device comprising male and female members provided with parts adapted to be brought into mating relationship for connecting said members together upon assembly and rotation of said members relative to each other, said female member being provided with a seat at one end thereof, means comprising a first sleeve slidably carried by said male member and having a projection adapted to be received in said seat for preventing said members from rotating relative to each other to a position where said parts are out of mating relationship to thereby maintain said parts in mating relationship, a locking element comprising a cup-like sleeve threadedly carried by said male member and longitudinally adjustable on said male member, said locking element being adapted to be moved up against said first sleeve when its said projection is in said seat to thereby hold said projection in said seat and thereby positively lock said members in connected relationship, and a coil spring within said cup-like sleeve around said male member, said spring being adapted, when said cup-like sleeve is turned up sufficiently toward said first sleeve, to engage said first sleeve and force said first sleeve into position where its said projection will enter said seat.

2. A mechanical coupling according to claim 1, characterized in that said first sleeve is provided with a shoulder, and characterized further in that said cup-like sleeve is adapted to be turned up on said male member a distance sufficient to engage said shoulder when said projection is in said seat to thereby prevent said first named sleeve from backing away from said female member.

3. A hose coupling comprising male and female members, said female member having a pair of inwardly directed, diametrically oppositely disposed segmental flanges at one end thereof, the spaces between said flanges constituting a pair of diametrically oppositely located seats, said male member having a pair of outwardly extending diametrically opposite segmental flanges adapted to engage behind said first named flanges when said male member is inserted into said female member a predetermined distance and said members are rotated relative to each other through a predetermined angle to thereby bring said flanges into mating relationship for connecting said members together, a first locking sleeve slidably carried by said male member and having a pair of diametrically opposed projections adapted to be received in said seats to prevent relative rotation of said members to a position where said flanges are withdrawn from said mating relationship, a second sleeve threaded on said male member adapted to be turned up against said first sleeve to lock it in position with its said projections in said seats thereby to positively lock said members in connected relationship, said second sleeve being cup-like in form, and a coil spring within said cup-like sleeve around said male member, said spring being adapted, when said cup-like sleeve is turned up along said male member sufficiently toward said first locking sleeve, to engage said first locking sleeve and force said first locking sleeve into position where its said projections will enter said seats.

4. A hose coupling according to claim 3 characterized in that said first locking sleeve has a portion of relatively large diameter and a portion of relatively small diameter, said small diameter portion being receivable in said cup-like sleeve and said large diameter portion providing a shoulder against which said cup-like sleeve is adapted to abut when turned up along said male member to prevent withdrawal of said first locking sleeve projections from said seats.

5. A hose coupling according to claim 4 characterized further in that when said cup-like sleeve is turned up along said male member sufficiently toward said first locking sleeve, said coil spring engages the proximate end of said small diameter portion and forces said first locking sleeve into position where its said projections will enter said seats, and said cup-like sleeve, upon being further turned up sufficiently along said male member, engaging said shoulder to lock said first locking sleeve in said position.

HERBERT A. MAIMAN.

REFERENCES CITED

The following references are of record in the file of this patent:

UNITED STATES PATENTS

| Number | Name | Date |
|---|---|---|
| 62,221 | Phillipi | Feb. 19, 1867 |
| 199,312 | Perkins | Jan. 15, 1878 |
| 1,093,528 | Bowes | Apr. 14, 1914 |
| 1,341,135 | Kennedy | May 25, 1920 |